No. 822,046. PATENTED MAY 29, 1906.
L. C. HOBART.
LUBRICATOR FOR LOOSE PULLEYS.
APPLICATION FILED JAN. 13, 1906.
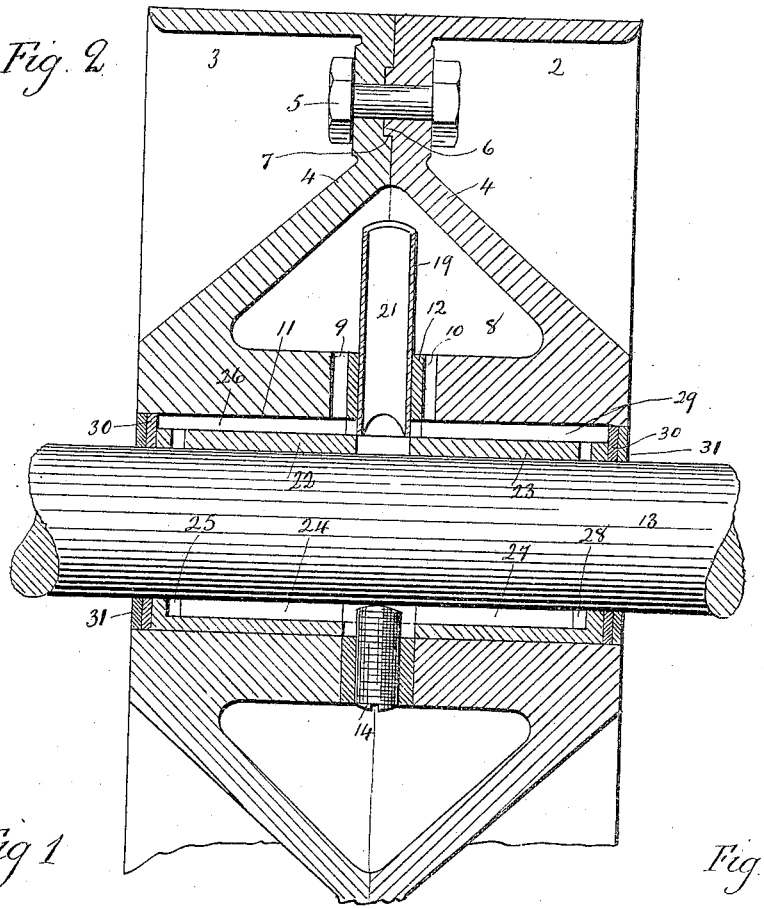
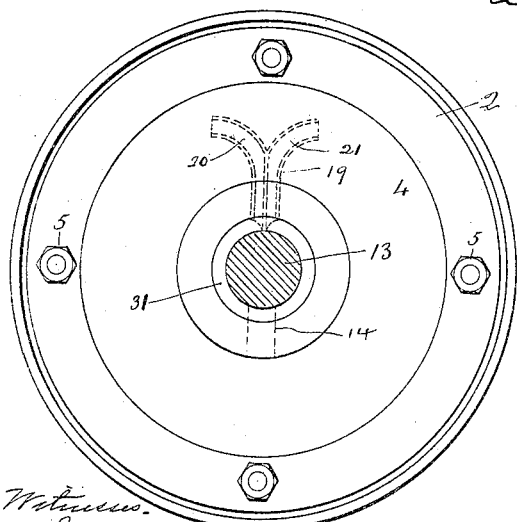
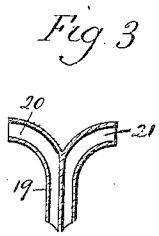
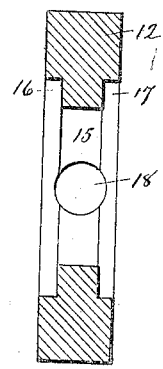

UNITED STATES PATENT OFFICE.

LOUIS C. HOBART, OF SOUTHINGTON, CONNECTICUT.

LUBRICATOR FOR LOOSE PULLEYS.

No. 822,046.   Specification of Letters Patent.   Patented May 29, 1906.

Application filed January 13, 1906. Serial No. 295,955.

*To all whom it may concern:*

Be it known that I, LOUIS C. HOBART, a citizen of the United States, residing at Southington, in the county of Hartford and State of Connecticut, have invented a new and useful Improvement in Lubricators for Loose Pulleys; and I do hereby declare the following, when taken in connection with the accompanying drawings and the figures of reference marked thereon, to be a full, clear, and exact description of the same, and which said drawings constitute part of this specification, and represent, in—

Figure 1, a side view of a pulley constructed in accordance with my invention; Fig. 2, a broken vertical sectional view of the same; Fig. 3, a sectional view of the lubricating conductor-tube detached; Fig. 4, a vertical sectional view of the ring detached.

This invention relates to an improvement in lubricators for loose pulleys, and is an improvement on the invention for which Letters Patent No. 804,722 were granted to me November 14, 1905, and, as in the patent above referred to, by the term "pulley" I wish to be understood as including the completed pulley or the hub of a pulley or wheels for any desired purposes. Lubricators constructed in accordance with my previous patent were only adapted for movement in one direction, and if it was desired to reverse the movement of the pulley a change was also required in the lubricating device. Also in my previous patent I described the shaft as having longitudinal grooves which necessitated the location of the pulleys over these grooves.

The object of this invention is to produce a pulley adapted to be driven in either direction, located at any desired point on the shafting, less liable to have the oil escape either at the ends of the hubs or at the union of its two parts, and to have its parts more firmly secured together than was possible in the pulley of my prior patent referred to.

With these ends in view my invention consists in the construction as herein shown and described, and particularly recited in the claims.

The pulley is formed in two parts 2 and 3, secured together through their webs 4 by bolts 5. Preferably and as herein shown the face of one web is formed with an annular rib 6 and the other member with an annular groove 7, so that when the parts are fitted together the rib will enter the groove and not only hold the two parts in alinement, but also prevent the escape of any oil between the two parts. If desired, packing material of any appropriate character may be introduced into the bottom of the said groove to assist in preventing leakage. As herein shown, the parts 2 and 3 form the pulley proper; but in pulleys of larger diameter these parts form the hub of the pulley, one of the parts supporting a rim of larger diameter. The adjacent faces of the parts 2 and 3 are recessed to form a chamber 8, substantially triangular in cross-section, from which ports 9 10 extend to a central bore 11. The walls of the base of the chamber do not meet, but provide space for a collar 12, which is fixed to a shaft 13 by a set-screw 14. The collar 12 has a central opening 15, which closely fits the shaft 13, and concentric with this opening and on either side are recesses 16 and 17. Extending radially through the collar 12 is a hole 18, slightly larger in diameter than the length of the central opening 15, and into this hole is inserted a double tube 19. This tube has passages 20 and 21, through either of which oil may be taken from the chamber and conducted to the surface of the shaft 13, and by having the two branches in opposite directions the pulley may be driven in either direction. The opening in the bore 11 is larger than the diameter of the shaft 13 to receive bushings 22 and 23, which extend from the collar 12 toward the outer ends of the bore. The bushing 22 is formed with an internal longitudinal channel 24, which communicates with an annular channel 25, opening into an external channel 26, which in turn communicates with the port 9 into the chamber 8. The bushing 23 has a similar internal longitudinal channel 27, annular channel 28, and external longitudinal channel 29, which communicates through the port 10 with the chamber 8. At the outer ends of these bushings I locate washers 30, of cotton, felt, or any other suitable absorbent material, to absorb any lubricant failing to pass into the internal annular grooves of the bushings, and thus prevent the escape of any lubricant from the bearing. These washers 30 are held in place by steel washers or rings 31, either solid or split, so as to be forced or sprung into the ends of the pulley-hub to hold the absorbent washers 30 in place. It will thus be seen that in my improved construction the two parts of the pulley are interlocked with each other, so as to form a practically integral construction, that the pulley may be driven in either direction, that oil passing from the chamber to the shaft will be returned to the chamber without the possibility of escaping, and also that the pulley may be placed upon the shaft at any desired point without previously preparing the shaft for it.

I claim—

1. The combination with a shaft, of a pulley formed in two parts, recessed at their inner faces to form a chamber and to provide space for the ring, a ring located between said parts and secured to said shaft, said ring having a central bore to closely fit said shaft and concentric recesses on each side, bushings surrounding said shaft and closely fitting the interior of the pulley on opposite sides of the ring, said bushings formed with internal and external longitudinal channels connected by an annular channel near the outer ends of the bushings, a tube mounted in said ring and formed with two passages opening onto said shaft and into said chamber, the openings in the chamber turned in opposite directions an absorbent washer at the outer ends of said bushings, and metal washers to hold the same in place, substantially as described.

2. The combination with a shaft, of a pulley formed in two parts, recessed at their inner faces to form a chamber and to provide space for the ring, a ring located between said parts and secured to said shaft, said ring having a central bore to closely fit said shaft, and a concentric recess on each side, bushings surrounding said shaft and closely fitting the interior of the pulley on opposite sides of the ring, said bushings formed with internal and external longitudinal channels connected by an annular channel near the outer ends of the bushings, and a double tube mounted in said ring and opening into said recesses and into said chamber whereby oil is conducted from said chamber to the shaft and returned to the chamber.

In testimony whereof I have signed this specification in the presence of two subscribing witnesses.

LOUIS C. HOBART.

Witnesses:
CLARA L. WEED,
GEORGE D. SEYMOUR.